(12) United States Patent
Ishii et al.

(10) Patent No.: US 6,724,577 B2
(45) Date of Patent: Apr. 20, 2004

(54) MAGNETIC DISC ARRANGEMENTS WITH AERODYNAMIC LATCH MECHANISM

(75) Inventors: Eiji Ishii, Chiyoda (JP); Takashi Kouno, Chiyoda (JP); Hayato Shimizu, Ryugasaki (JP)

(73) Assignee: Hitachi, Ltd., Tokyo (JP)

( * ) Notice: Subject to any disclaimer, the term of this patent is extended or adjusted under 35 U.S.C. 154(b) by 186 days.

(21) Appl. No.: 09/790,690

(22) Filed: Feb. 23, 2001

(65) Prior Publication Data

US 2002/0036866 A1 Mar. 28, 2002

(30) Foreign Application Priority Data

Sep. 28, 2000 (JP) ........................... 2000-300548

(51) Int. Cl.[7] ................................................ G11B 5/54
(52) U.S. Cl. ................................................ 360/256.1
(58) Field of Search ..................................... 360/256.1

(56) References Cited

U.S. PATENT DOCUMENTS

| | | | | |
|---|---|---|---|---|
| 5,036,416 A | * | 7/1991 | Mastache | ................. 360/256.1 |
| 5,274,519 A | * | 12/1993 | Saito | ........................ 360/256.1 |
| 5,717,544 A | | 2/1998 | Michael | |
| 5,793,572 A | | 8/1998 | Lalouette et al. | |
| 6,430,007 B1 | * | 8/2002 | Jabbari | ..................... 360/256.1 |
| 6,462,912 B1 | * | 10/2002 | Pasupathy et al. | ....... 360/256.1 |

FOREIGN PATENT DOCUMENTS

KR     1998-701412     5/1998

* cited by examiner

*Primary Examiner*—A. J. Heinz
(74) *Attorney, Agent, or Firm*—Antonelli, Terry, Stout & Kraus, LLP

(57) ABSTRACT

The structure is made such that an aerodynamic latch is provided in an outer portion of a magnetic disc, a front end portion exposed to a wind in the aerodynamic latch is formed to be shorter than an outer peripheral surface of the magnetic disc, and the wind receiving portion of the aerodynamic latch moves an air stream outlet from an end surface of the magnetic disc and a shroud in a direction of forming a flow passage for passing through a portion apart from the magnetic disc. Accordingly, a stable aerodynamic latch drive can be achieved and an air stream within the disc is not disturbed, so that it is possible to reduce a flutter and a consumed electric power.

14 Claims, 10 Drawing Sheets

FIG.9A
FIG.9B
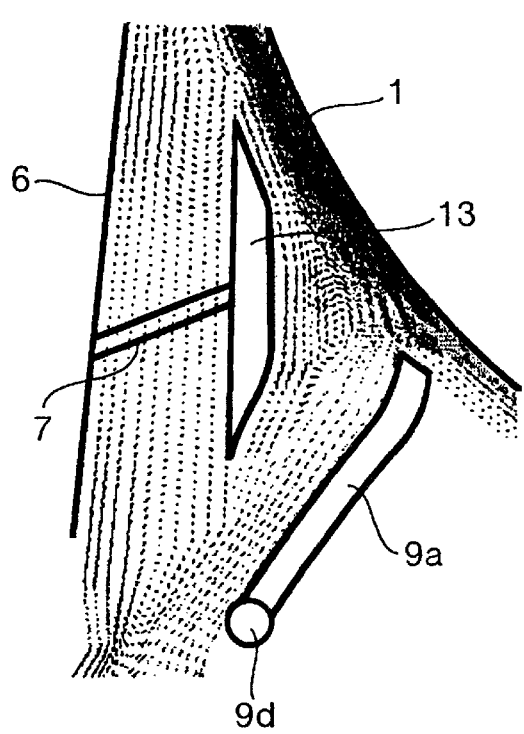
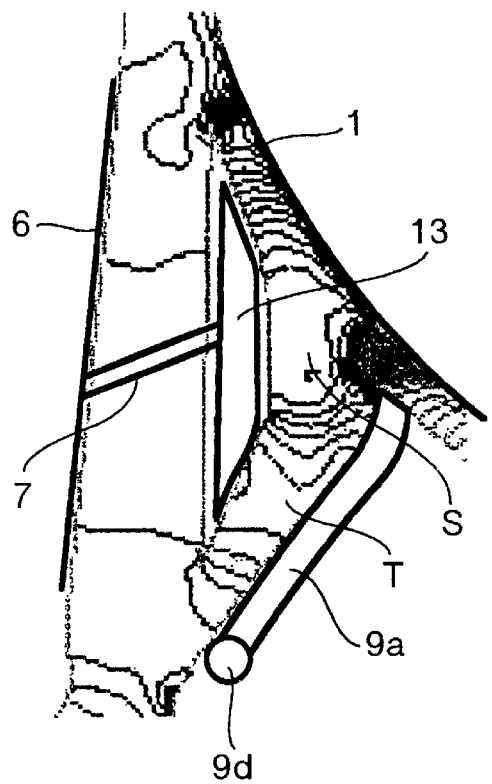

MAGNETIC DISC ARRANGEMENTS WITH AERODYNAMIC LATCH MECHANISM

BACKGROUND OF THE INVENTION

1. Field of the Invention

The present invention relates to a magnetic disc apparatus and more particular to a disc apparatus provided with an aerodynamic latch mechanism.

2. Description of the Prior Art

In the magnetic disc apparatus, there is a case that an aerodynamic latch is used for fixing an arm at a time when a disc is not rotated and canceling the fixation of the arm at a time when the disc is rotated. This is structured such that the fixation of the arm is cancelled by utilizing a force of an air stream generated due to a rotation of the disc.

As a prior art, there are Japanese Unexamined Patent Publication No. 4-228158 and U.S. Pat. No. 4,538,193. In Japanese Unexamined Patent Publication, the structure is made such that an air stream generated due to a rotation of a disc is directed to a passage being adjacent to the disc and narrowed gradually, by using a fixed air vane protruding into the disc, and the air stream strikes against an air vane provided on the passage so as to move an angle and release an actuator assembly. That is, the air vane is provided so as to clog a flow passage of the air stream, and the air flow passage is set to a clogged direction even in the case that the angle is moved.

Further, in U.S. Pat. No. 4,538,193, the structure is made such that a wind blade which is exposed to an air stream at a time when a disc is rotated and can rotate with respect to a predetermined shaft is protruded into a disc rotating disc, and an actuator lock is released by utilizing the air stream generated due to the rotation of the disc.

However, in the structure described in Japanese Unexamined Patent Publication No. 4-228158, the air vane clogs the air stream from the disc, and there is provided the fixed air vane protruding to the portion between the discs. Accordingly, since the stream between the discs is disturbed, there is a problem that a consumed electric power is increased and a disc vibration (hereinafter, refer to "flutter") caused by a fluid is generated. Further, in the structure described in U.S. Pat. No. 4,538,193, since the air vane protrudes to the portion between the discs, the same problem exists. In addition, there can be listed up problems such that the air vane occupies a wide space within the apparatus, the number of the parts is increased, a producing cost is increased and the like.

OBJECT AND SUMMARY OF THE INVENTION

An object of the present invention is to solve the problems mentioned above and to provide a magnetic disc apparatus which is compact and is provided with an aerodynamic latch mechanism having a high performance.

In order to achieve the object mentioned above, in accordance with the present invention, the structure is made such that an aerodynamic latch is provided in an outer portion of a magnetic disc, a front end portion exposed to a wind of the aerodynamic latch is opposed to an outer peripheral end of the magnetic disc, an air flow passage is formed between a portion exposed to the wind of the aerodynamic latch and a housing or a rectifying plate at a time when the aerodynamic latch is operated, and an air stream flows along an outer periphery of a rotary actuator.

Further, the structure is made such that a shroud is provided between the rotary actuator in a side where the aerodynamic latch is provided and the disc.

Further, a ramp mechanism for loading and unloading is arranged so as to constitute a part of a return flow passage of the air stream passing through the aerodynamic latch portion. Further, the air flow passage is integrally formed with the housing and a rotary shaft of the aerodynamic latch portion is mounted to a voice coil motor (VCM), thereby reducing the number of the parts.

BRIEF DESCRIPTION OF THE DRAWINGS

FIG. 9A is a schematic view showing a speed distribution in accordance with a numerical analysis in the case that the rectifying plate is provided;

FIG. 9B is a schematic view showing a pressure distribution in accordance with a numerical analysis in the case that the rectifying plate is provided.

DESCRIPTION OF THE EMBODIMENTS

Figure 1:
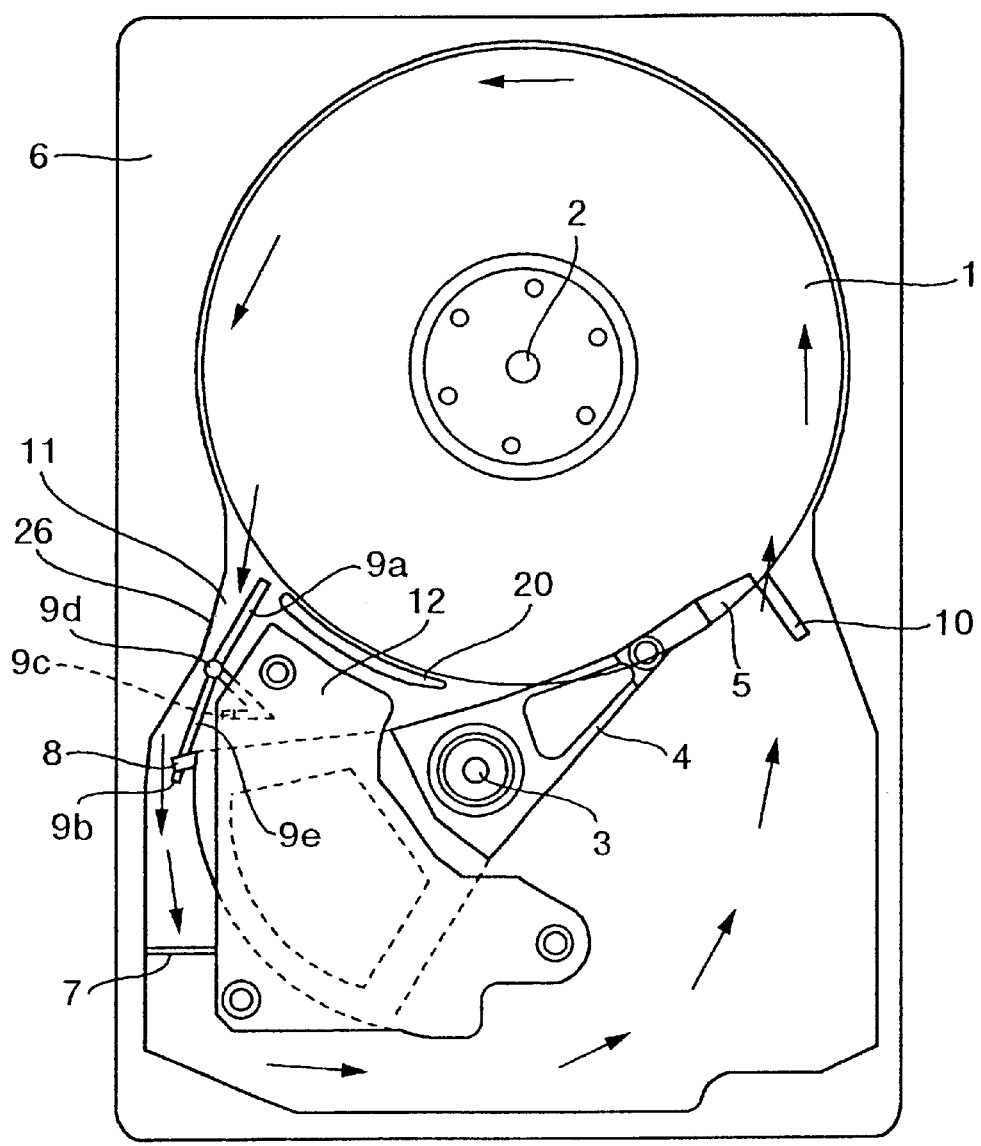
FIG. 1 is a schematic view of a disc apparatus in accordance with a first embodiment.
Figure 2:
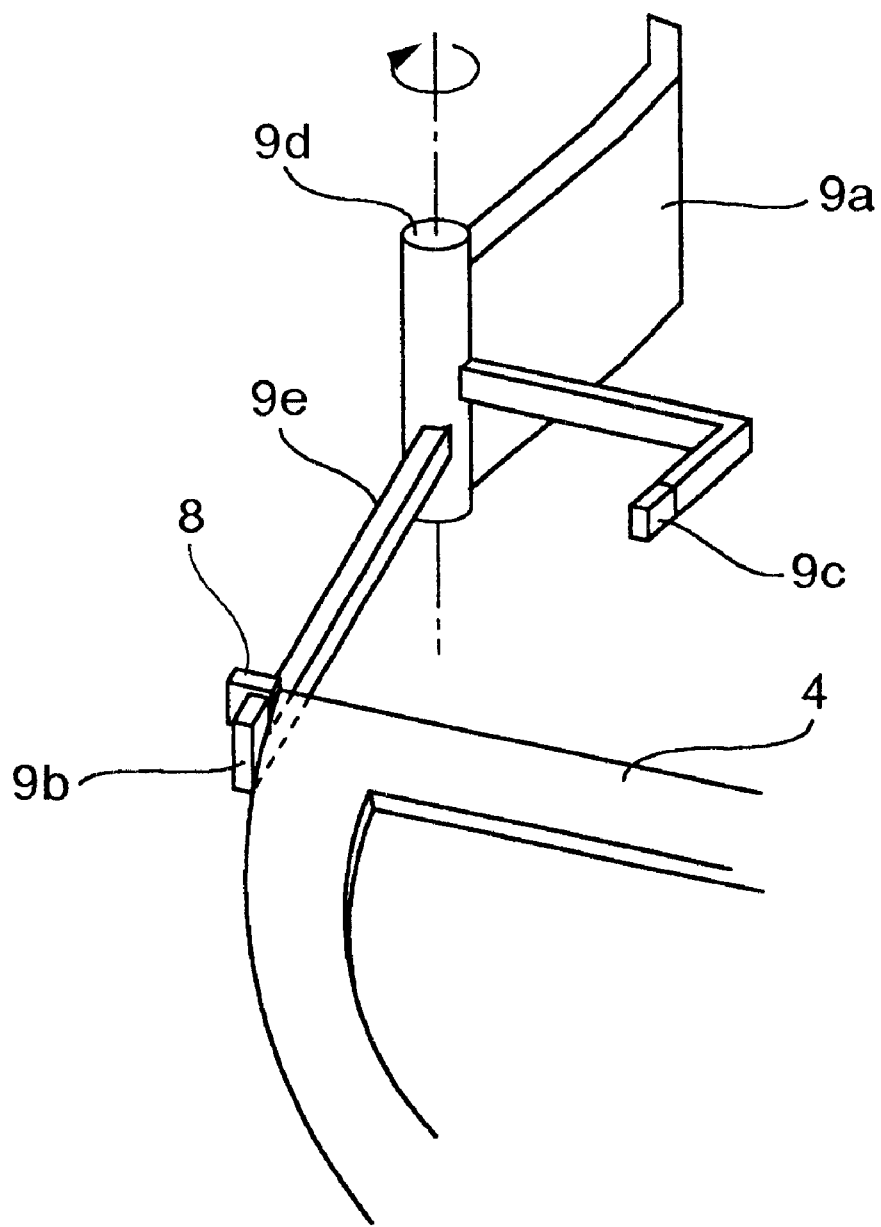
FIG. 2 is an enlarged view of an aerodynamic latch portion in accordance with the first embodiment.
Figure 3:
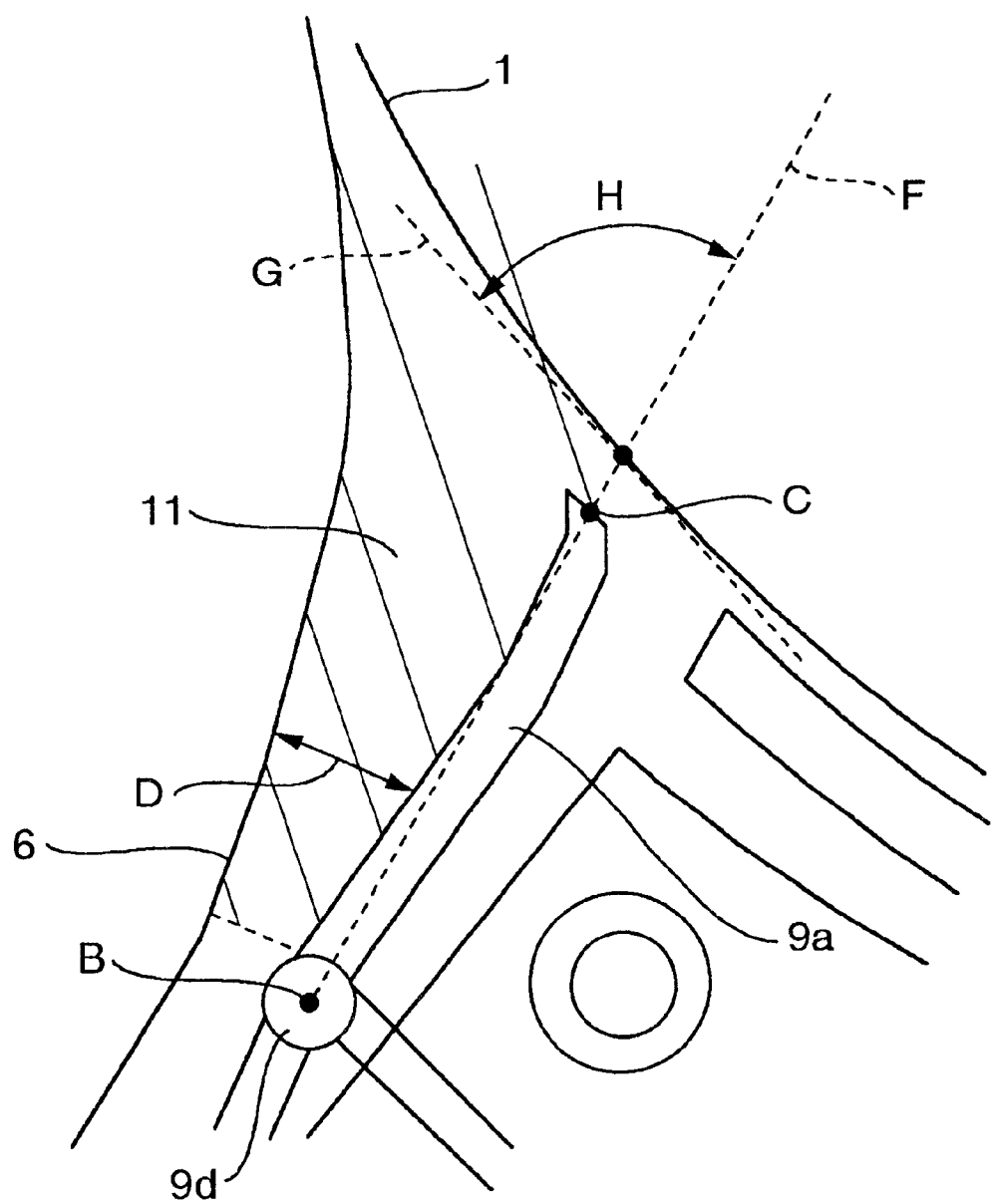
FIG. 3 is an enlarged view of a flow passage extending from a disc to an aerodynamic latch.

A description will be given of an embodiment in accordance with the present invention with reference to FIGS. 1 to 6. FIG. 1 is a schematic view explaining a magnetic disc apparatus to which the present embodiment is applied. FIG. 2 is an enlarged view of an aerodynamic latch mechanism shown in FIG. 1, and FIG. 3 is an enlarged view of a flow passage extending from a disc to an aerodynamic latch. FIGS. 4, 5 and 6 show results obtained by analyzing an air stream in the flow passage extending from the disc to the aerodynamic latch in accordance with a numerical analysis and explain effects of the present embodiment. The numerical analysis is performed under a calculating condition that a diameter of the disc is set to 84 mm, a rotational number of the disc is set to 10000 times/minute and a working fluid is set to a room temperature air. The calculating condition is the same in the case of FIGS. 8 and 9 which is described later.

As shown in FIG. 1, the magnetic disc apparatus in accordance with the present embodiment is provided with the following structure. The structure is made such that a plurality of magnetic discs 1 are fixed to a magnetic disc rotating shaft 2 connected to a spindle motor (which is not illustrated) in a laminated manner. An arm 4 is driven around an arm rotating shaft 3. In order to drive the arm 4, a coil (which is not illustrated) is provided in the arm 4 in a side of the arm rotating shaft 3, and constitutes a rotary actuator together with a magnet provided in a voice coil motor (VCM) 12 in such a manner as to oppose to the coil. A magnetic disc reading and writing head 5 is provided in a front end of the arm 4. The head 5 is held by a ramp portion 10 for loading and unloading, the ramp portion 10 being disposed in an outer portion of the disc 1 at a time when the disc 1 is not rotated.

In addition to the matters mentioned above, the structure is made such that an air stream generated due to the rotation passes through a flow passage 11 from an opening portion flowing out to the voice coil motor side, passed through the voice coil motor 12 portion and is circulated so as to again return to the magnetic disc from a back side of the ramp portion. A filter 7 for cleaning the air within the magnetic disc, an aerodynamic latch 9 (constituted by a wind receiving portion 9a, a latch 9b, a lock holding portion 9c and a rotary shaft 9d in FIG. 2) and the like are provided in the middle of the flow passage 11. An internal portion of a housing 6 of the magnetic disc apparatus is separated from an external portion and sealed.

An outer peripheral end surface of the disc 1 is surrounded by a shroud (wall) 26 corresponding to an inner side surface of the housing 6 except a space portion in which the arm 4 is rotated and the rotary actuator portion. An interval between the shroud 26 and the disc end surface is set to be substantially between 0.1 mm and 0.6 mm. Further, a shroud separated from the shroud 26 in the housing side by the flow passage portion 11 is formed between the voice coil motor (VCM) 12 in the side where the aerodynamic latch 9 is provided and the magnetic disc 1, by a shroud member 20. By making the structure such as to surround the disc end surface by the shroud as mentioned above, it is possible to restrict a turbulent motion of the air stream generated in accordance with the disc rotation and a pressure change between the disc surfaces and it is possible to prevent a flutter from being generated. Further, by operating the aerodynamic latch so as to form an air circulating flow passage, the air stream within the sealed disc apparatus is rectified, whereby it is possible to reduce a generation of the turbulent motion within the apparatus. Accordingly, it is possible to reduce a consumed electric power, and it is possible to reduce vibration of the disc surface and the arm caused by the generation of the turbulent motion.

Further, by providing the shroud member 20 between the voice coil motor (VCM) 12 and the disc end surface, the structure is made such that the air stream generated due to the disc rotation effectively strikes against the wind receiving portion 9a in the aerodynamic latch.

In FIG. 1, when the disc 1 rotates in a counterclockwise direction, the air above the disc 1 rotates together with the disc. A part of the rotating air strikes against the wind receiving portion 9a of the aerodynamic latch 9 provided in the opening portion of the air flow passage 11 as shown by an arrow in FIG. 1, and the wind receiving portion 9a moves to the voice coil motor (VCM) 12 (or the shroud member 20) side due to a wind force. The air stream in a direction of depth of the apparatus is again returned to the disc 1 from a back portion of the ramp 10 portion through a side portion of the wind receiving portion 9a and an arm portion 9e, the filter 7 and the voice coil motor (VCM) 12. In this case, an arrow in FIG. 1 shows a wind stream on the substantially same surface as the disc surface, and the wind stream in the depth direction is slightly different therefrom and flows substantially along the shroud in the periphery of the housing.

A description will be given of an aerodynamic latch mechanism in accordance with the present invention with reference to FIG. 2. FIG. 2 shows the aerodynamic latch portion shown in FIG. 1 in a three-dimensionally enlarging manner.

The air stream flowing thereinto from the disc 1 strikes against the wind receiving portion 9a. In accordance with the present embodiment, the wind receiving portion 9a is bent in a direction exposed to the wind near a front end portion, in order to secure a large area for being exposed to the wind. In this case, a shape of the wind receiving portion is not limited to the shape of the present embodiment but may be a curved surface, and the wind receiving portion may be formed by a flat plate (a linear plate) as far as a sufficiently great wind force can be obtained.

In this case, the aerodynamic latch is supported by the rotary shaft 9d, and is angularly moved in a direction of an arrow in FIG. 2 (in a clockwise direction) when the air stream strikes against the wind receiving portion 9a. The wind receiving portion 9a is connected to the rotary shaft 9d. Further, the arm portion 9e is connected to the rotary shaft 9d, and the latch 9b is provided at a front end of the arm portion 9e. In this case, a length of the wind receiving portion 9a is structured such that the end surface of the wind receiving portion 9a and the disc outer peripheral end surface are substantially opposed to each other so as to prevent the wind receiving portion 9a from being brought into contact with the outer peripheral end of the disc 1.

When the disc is not rotated, the magnetic head stays in the ramp 10, and the latch 9b is hooked in a projection 8 at a rear portion of the arm 4. Accordingly, the arm is structured such as to be fixed and not move. However, when the disc is rotated and the wind strikes against the wind receiving portion 9a, the wind receiving portion 9a rotates around the rotary shaft 9d in a clockwise direction. That is, the rotation is performed in a direction that an air flow passage 11 constituted by the wind receiving portion 9a is expanded. The structure is made such that the arm portion 9e is also rotated in correspondence to the rotation of the rotary shaft, and the latch 9b is taken out from the projection 8, whereby the fixation of the arm 4 is cancelled. Since a surface area of the arm portion 9e and the latch 9b is sufficiently smaller than that of the wind receiving portion 9a, it is considered that a resistance of the air stream in this portion is small at a degree which can be ignored.

The lock holding portion 9c protruding into the voice coil motor (VCM) 12 is provided in the rotary shaft 9d. A metal acting upon a magnetic force is contained in the member of the lock holding portion 9c, and it is possible to adjust a force necessary for the latch 9b being taken out from the projection 8 by suitably setting the magnetic force between the metal and the voice coil motor (VCM) 12. In this case, the lock holding member 9c may be formed by a magnetic material in place of containing the metal as mentioned above. Further, in accordance with the present embodiment, the lock holding portion 9c is provided in the rotary shaft 9d, however, it is a matter of course that the lock holding portion 9c may be provided in the arm portion 9e.

Figure 5A:
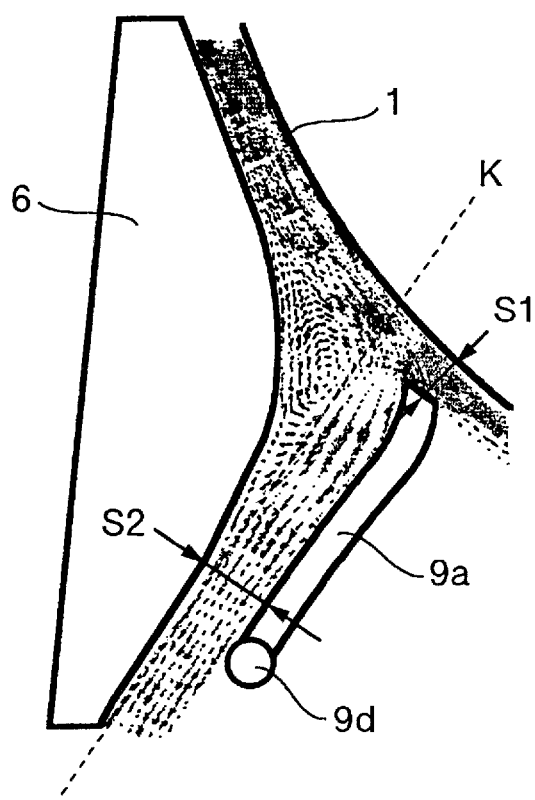
FIG. 5A is a schematic view showing a speed distribution in accordance with a numerical analysis in the case that the wall surface is formed in a shape protruding to the aerodynamic latch side.

FIG. 3 is an enlarged view of the flow passage extending from the disc 1 toward the aerodynamic latch 9 at a time when the aerodynamic latch fixes the arm. FIG. 5A is a schematic view showing the air stream near the flow passage 11 in FIG. 3 (a hatched portion in FIG. 3) calculated in accordance with a numerical analysis.

As shown in FIG. 5A, it is known that in the air stream in the periphery of the disc 1, a component in a direction along the disc outer periphery (in a side where lines are crowded) is great. Accordingly, the end portion of the wind receiving portion 9a is better in the case of being close to the disc end surface. However, when the structure is made such as to enter into the disc surface, it is necessary to modify the shape of the wind receiving portion 9a and it is necessary to prevent the wind receiving portion 9a from being brought into contact with the disc end surface portion. Accordingly, it is preferable that the end portion of the wind receiving portion 9a is set to a length opposing to the disc end surface portion.

Further, in order that the wind receiving portion 9a of the aerodynamic latch obtains greater air force, it is desirable that in FIG. 3, a straight line F connecting between a center B of the rotary shaft and a front end C of the wind receiving portion forms an angle H of 90 degrees with respect to a tangent line G on the outer periphery of the disc 1. However, in the case that the shape of the wind receiving portion 9a is deformed at a degree of being widely apart from the straight line F, it is desirable to set the angle H formed between the portion near the front end of the wind receiving portion 9a and the tangent line G to 90 degrees. Further, unless the front end of the wind receiving portion 9a enters into the disc 1 surface (it is necessary to consider a position after the wind receiving portion 9a moves), it is desirable that the front end of the wind receiving portion 9a is arranged as close as possible to the disc outer periphery.

Further, when a width D of the flow passage 11 is defined by a value at which a straight line extending from the wind receiving portion 9a of the aerodynamic latch to the opposing flow passage side surface becomes shortest, the flow passage width D is structured such as to be gradually narrowed as being apart from the disc. However, the flow passage width in the disc 1 side from a C point in the drawing is defined by a shortest distance of a straight line extended from the straight line F to the opposing flow passage side surface. That is, the shroud portion is formed by a curved surface protruding to the aerodynamic latch side from the disc end surface and an opening portion 27 of the shroud 26, and a flow passage of a rotating stream is formed by the curved surface wall and the wind receiving portion 9a of the aerodynamic latch 9. The structure is made such that the wind receiving portion 9a of the aerodynamic latch is easily exposed to the rotating stream by forming by the protruding curved surface as mentioned above.

Figure 4A:
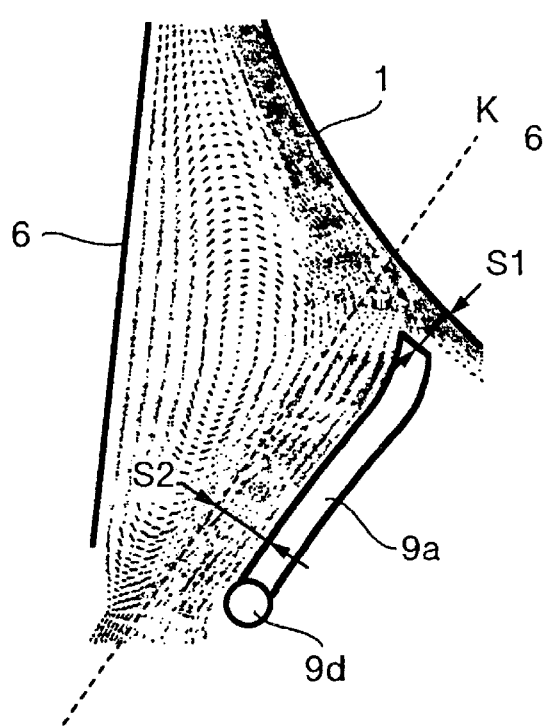
FIG. 4A is a schematic view showing a speed distribution in accordance with a numerical analysis in the case that a wall surface opposing to an aerodynamic latch wind receiving portion is a linear shape.
Figure 4B:
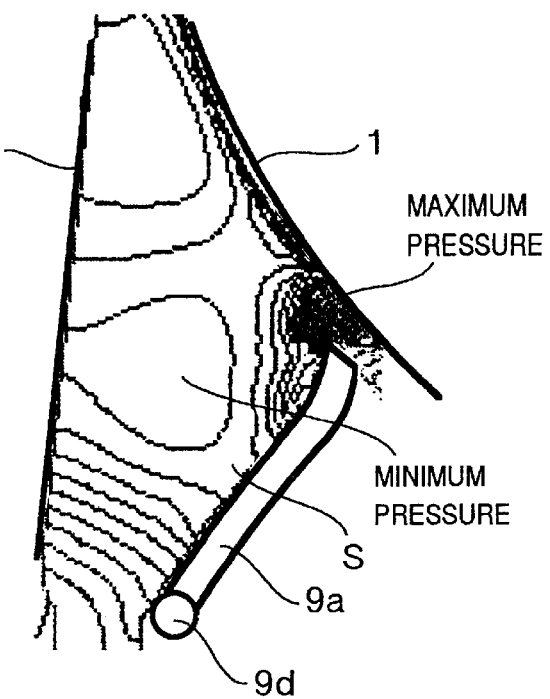
FIG. 4B is a schematic view showing a pressure distribution in accordance with a numerical analysis in the case that the wall surface opposing to the aerodynamic latch wind receiving portion is a linear shape.
Figure 8A:
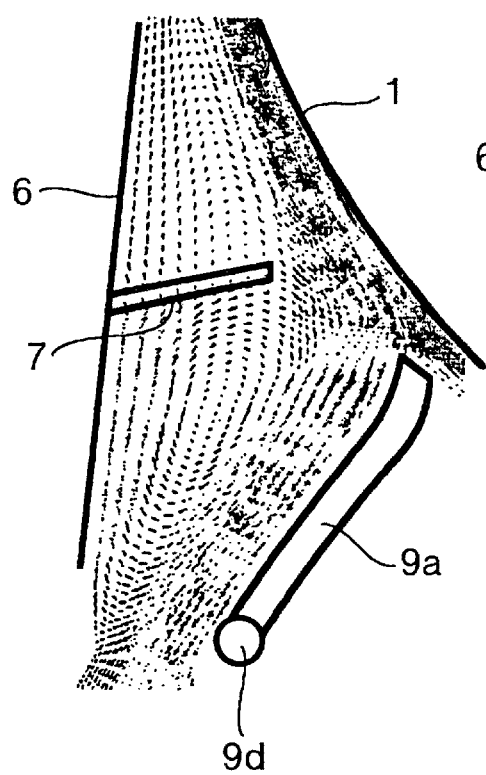
FIG. 8A is a schematic view showing a speed distribution in accordance with a numerical analysis in the case that a rectifying plate is not provided.
Figure 8B:
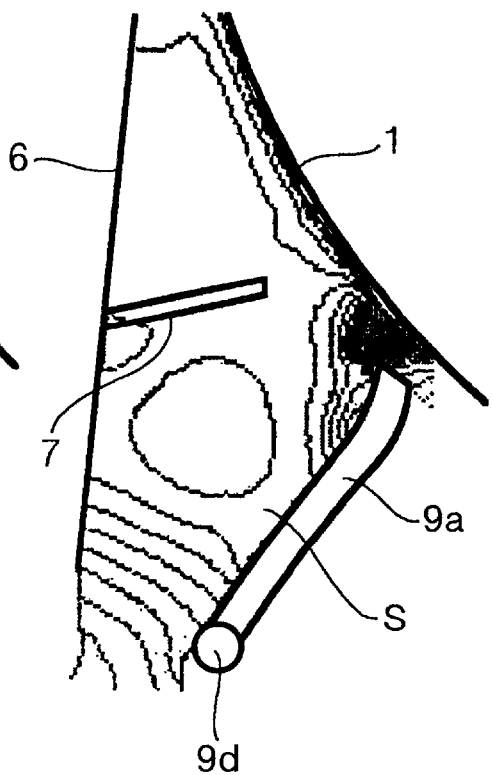
FIG. 8B is a schematic view showing a pressure distribution in accordance with a numerical analysis in the case that the rectifying plate is not provided.

A description will be given of an effect obtained by the flow passage shape with reference to FIGS. 4 to 6. FIGS. 4A, 5A and 6A show a speed distribution, FIGS. 4B, 5B and 6B show a pressure distribution, and in the same manner, FIGS. 8A and 9A show a speed distribution, FIGS. 8B and 9B show a pressure distribution. FIGS. 4A and 4B show results obtained by analyzing a stream near the wind receiving portion before the aerodynamic latch moves in accordance with a numerical analysis, in the case that the flow passage structure in accordance with the present embodiment is not provided. As is understood from a speed distribution shown in FIG. 4A, a large vortex is generated near the wind receiving portion 9a. As a result, in a pressure distribution shown in FIG. 4B, the pressure becomes highest in the portion between the front end of the wind receiving portion and the disc and the pressure becomes low near an S point of the wind receiving portion.

Figure 5B:
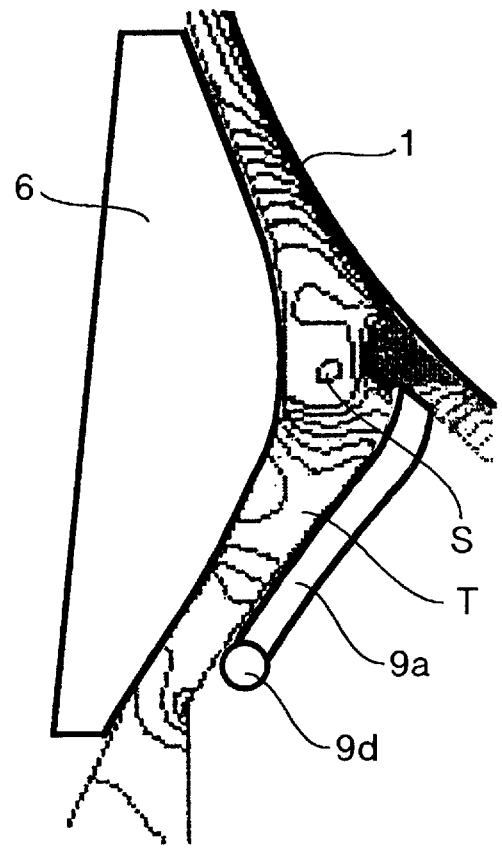
FIG. 5B is a schematic view showing a pressure distribution in accordance with a numerical analysis in the case that the wall surface is formed in a shape protruding to the aerodynamic latch side.

On the contrary, FIGS. 5A and 5B show calculated results before the aerodynamic latch moves, in the case of the flow passage structure in accordance with the present embodiment. As is understood from a speed distribution shown in FIG. 5A, a size of the vortex is made small. As a result of this, in a pressure distribution shown in FIG. 5B (a pressure at an S point in FIG. 5B indicates the same magnitude as that of the pressure of the S point in FIG. 4B), the pressure at a portion T near the wind receiving surface of the wind receiving portion 9a is high (the pressure at the T portion is higher than the pressure at the S portion), it is understood that the air force of the wind receiving portion 9a is greater than that in the case that the flow passage structure in accordance with the present invention is not provided.

Figures 6A, 6B:
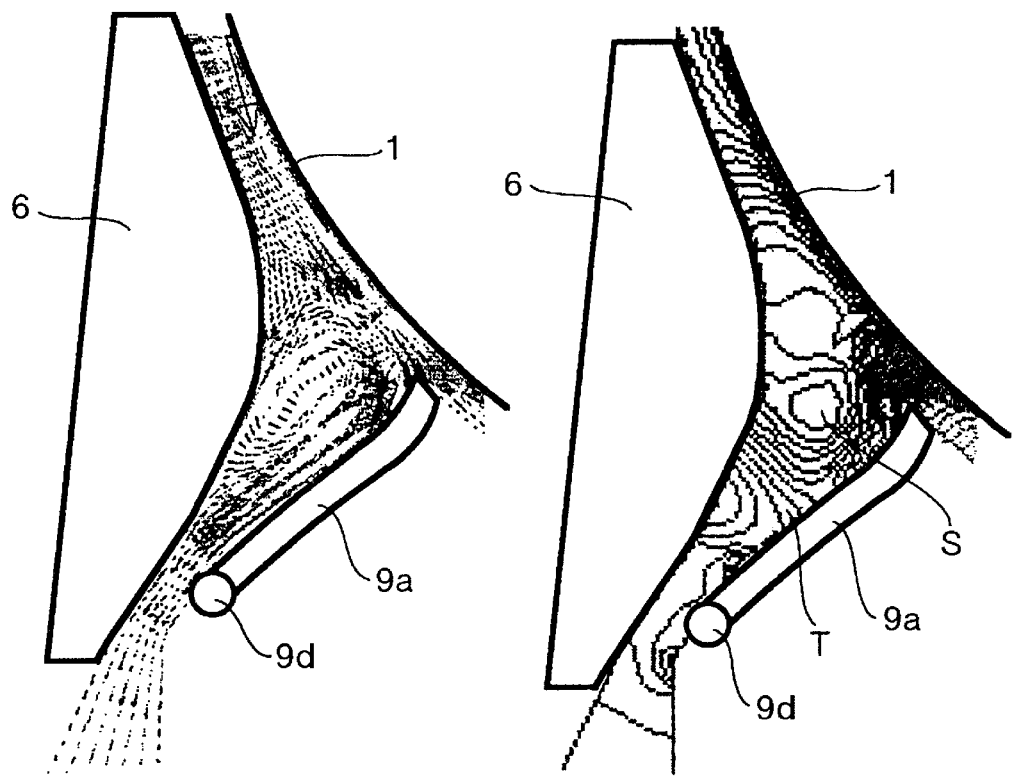
FIGS. 6A and 6B are schematic views showing results in accordance with a numerical analysis after the aerodynamic latch is moved in the flow passage shape shown in FIGS. 5A and 5B.

FIGS. 6A and 6B show results obtained by analyzing a stream near the aerodynamic latch after the wind receiving portion of the aerodynamic latch mechanism in accordance with the present embodiment moves due to an influence of the air stream (that is, at a time when the disc 1 rotates) in accordance with a numerical analysis. A vortex of a speed field in FIG. 6A becomes greater than that in the case shown in FIG. 5A. However, with respect to a pressure of the wind receiving portion in FIG. 6B, a high pressure (the pressure at the S and T portions in FIG. 6B have the same magnitude as that of the pressure at the S and T portions in FIG. 5B) can be obtained in the same manner as that in FIG. 5B, and it is understood that a holding force of the aerodynamic latch can be obtained even at a time when the disc is rotated after the wind receiving portion 9a moves.

As is shown in the speed distributions in FIGS. 4A and 5A, a boundary of an area having a high flow speed near the wind receiving portion 9a is denoted by a dotted line K. The flow speed boundary is arranged substantially at the same position in FIGS. 4A and 5A. A width S2 between the boundary and the wind receiving portion 9a is about 5 mm in the present embodiment. In this case, in FIGS. 4 and 5, a distance S1 between the front end of the wind receiving portion 9a in the aerodynamic latch and the disc 1 is 3 mm. Comparing FIG. 4A with FIG. 5A, the vortex is formed in the area except the area having the width of 5 mm mentioned above and causes the reduction of pressure. Accordingly, in the outer shape and the rotational number of the disc mentioned above, it is desirable that the minimum width of the flow passage toward the aerodynamic latch is equal to or less than 5 mm.

Figure 7:
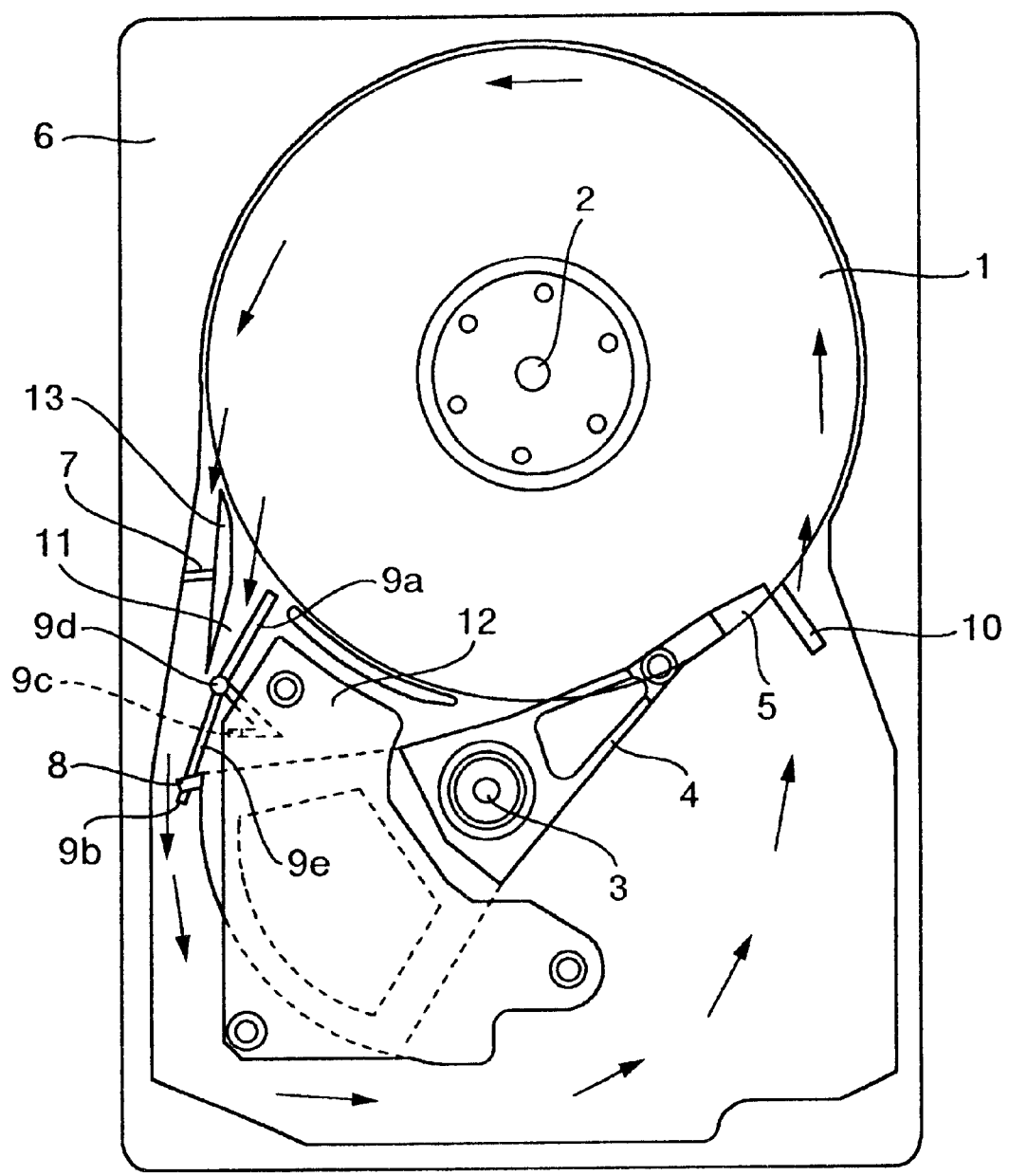
FIG. 7 is a schematic view of a disc apparatus in accordance with a second embodiment.

Next, a description will be given of a second embodiment in accordance with the present invention with reference to FIG. 7. A difference between the present embodiment and the preceding embodiment exist in a point that a rectifying plate is provided near the opening portion of the flow passage 11 extending from the disc so as to separate the air stream and combine in a downstream side. That is, as shown in FIG. 7, the structure is made such that the aerodynamic latch 9 and the filter 7 are provided in an adjacent manner and a portion therebetween is partitioned by using a rectifying plate 13. A guide for inserting is provided in a mounting portion of the filter in the rectifying plate 13 and the housing 6 so that the filter can be easily replaced.

In accordance with the present embodiment, the flow passage shape formed between the wind receiving portion 9a of the aerodynamic latch and the rectifying plate 13 is structured so as to be narrowed as being apart from the disc 1 in the same manner as that in FIG. 3, whereby it is possible to increase the air force applied to the wind receiving portion 9a. In the case that the filter 7 and the aerodynamic latch 9 are provided near the disc 1 in an adjacent manner as in the present embodiment, the filter effect is reduced in comparison with the case that only the filter 7 is placed near the disc. However, since the stream within the disc apparatus circulates within the sealed space, a sufficient filter effect can be obtained even in the structure in accordance with the present embodiment. On the contrary, it is possible to obtain a great advantage that a compact design can be performed by arranging the filter 7 and the aerodynamic latch 9 in an adjacent manner. Further, it is possible to reduce the number of the parts by integrally forming the rectifying plate 13 with the housing 6 at the same time.

FIGS. 8A and 8B show results obtained by analyzing a flow field near the wind receiving portion 9a before the aerodynamic latch moves in accordance with a numerical analysis, in the case that the filter is provided in the air flow passage 11 without providing with the rectifying plate. FIGS. 9A and 9B show results obtained by analyzing the flow field near the wind receiving portion 9a before the aerodynamic latch moves in accordance with a numerical analysis, in the case that the rectifying plate 13 is provided. FIGS. 8A and 9A show a speed distribution and FIGS. 8B and 9B show a pressure distribution. A calculating condition is the same as that of FIGS. 4, 5 and 6. It is understood that when the rectifying plate 13 is not provided as shown in FIGS. 8A and 8B, a great vortex is generated as shown in the speed distribution shown in FIG. 8A so as to weaken the effect of the filter 7. Further, with respect to the pressure distribution shown in FIG. 8B, it is understood that the pressure is low in the wind receiving portion 9a of the aerodynamic latch (the pressure at the S portion in FIG. 8B has the same magnitude as that of the pressure at the S portion in FIG. 4B).

On the contrary, with respect to the case that the rectifying plate 13 shown in FIGS. 9A and 9B, the great vortex is prevented from being generated in the speed field in FIG. 9A, and the stream in the filter portion is rectified rather than the case shown in FIG. 8A. Further, with respect to the pressure distribution shown in FIG. 9B, the pressure is high at the wind receiving portion 9a of the aerodynamic latch (the pressures at the S and T portions in FIG. 9B are the same as the magnitudes of the pressures at the S and T portions in FIG. 5B and the pressure at the T point is grater than the pressure at the S portion), and it is understood that the greater air stream force than that of the case in FIG. 8 in which the rectifying plate 13 is not provided is applied to the wind receiving portion 9a.

Figure 10:
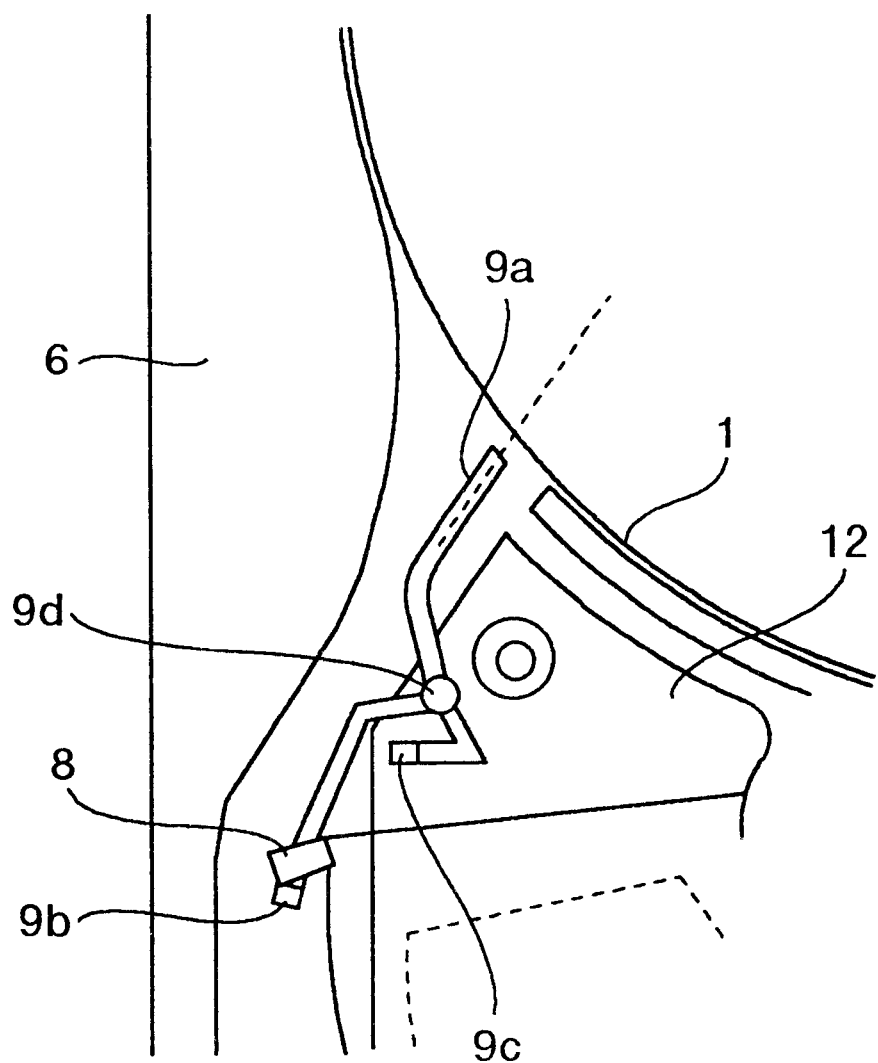
FIG. 10 is a schematic view of an aerodynamic latch in accordance with a third embodiment.

A description will be given of a third embodiment with reference to FIG. 10. In the present embodiment, the structure is made such that the rotary shaft 9d of the aerodynamic latch is mounted to the voice coil motor (VCM) 12. Since it is necessary to form a bearing portion of the rotary shaft in a cover of the apparatus in the case that the rotary shaft 9d is provided in the housing 6, there are problems such that a working cost is increased, an assembling becomes complex and the like. On the contrary, when the rotary shaft 9d is provided in the cover portion of the voice coil motor (VCM) 12, there are advantages such that the working cost is reduced and the assembling can be easily performed.

Further, in accordance with the present embodiment, in connection with the position at which the rotary shaft 9d is provided, the wind receiving portion 9a is deformed so as to be along the shroud side. Since the force caused by the air stream is greatly generated as the wind receiving portion 9a is close to the disc 1, the structure is made such that the front end portion side of the wind receiving portion 9a is formed in a linear shape and an extension line of the line is directed toward the center of the rotary shaft 2 of the disc 1. By forming the shape in this manner, it is possible to effectively strike the air stream around the outer periphery of the disc 1 as shown in FIG. 5 so as to obtain a great air force.

In accordance with the magnetic disc apparatus of the present invention, it is possible to realize a stable aerodynamic latch drive by effectively applying the force due to the air stream generated together with the rotation of disc to the aerodynamic latch without increasing the flutter and the consumed electric power. Further, it is possible to realize the aerodynamic latch requiring a small space and a reduced number of parts.

What is claimed is:

1. A magnetic disc apparatus comprising:
    a plurality of magnetic discs on a rotary shaft;
    an arm supporting a magnetic head and inserted between said magnetic disc;
    a rotary actuator to move said arm; and
    an aerodynamic latch to lock said arm to a substantially fixed position at a time when said magnetic discs are not rotated, and including a vane arrangement to unlock said arm by utilizing a force of an air stream generated at a time when said magnetic discs are rotated,
    wherein all vanes of said vane arrangement are disposed outside a periphery of said magnetic discs, and wherein an outer end of said aerodynamic latch is provided to substantially oppose to an outer peripheral end surface of said magnetic discs;
    wherein a body of said moveable vane of said aerodynamic latch moves to a position which is substantially perpendicular to a tangent of said magnetic discs as a result of the force of the air stream.

2. A magnetic disc apparatus as claimed in claim 1, wherein a moveable vane of said aerodynamic latch is formed in substantially a linear shape, and wherein an extension line of a straight line drawn through said moveable vane is directed substantially in a direction of the rotary shaft of said magnetic discs.

3. A magnetic disc apparatus as claimed in claim 1, wherein an outer end of a moveable vane of said aerodynamic latch moves toward said magnetic discs as a result of the a force of the air stream.

4. A magnetic disc apparatus comprising:
    a plurality of magnetic discs on a rotary shaft;
    an arm supporting a magnetic head and inserted between said magnetic discs;
    a rotary actuator to move said arm;
    an aerodynamic latch to lock said arm to a substantially fixed position at a time when said magnetic discs are not rotated, and including a vane arrangement to unlock said arm by utilizing a force of an air stream generated at a time when said magnetic discs are rotated, wherein all vanes of said vane arrangement are disposed outside a periphery of said magnetic discs,
    an air flow passage to flow an air stream from said magnetic discs;
    a filter to remove contaminants from said air stream; and
    a rectifying plate to divide the air stream into a filter side air stream and a latch side air stream, wherein the filter side air stream and the latch side air stream are combined in a downstream side of said rectifying plate;

wherein a body of said moveable vane of said aerodynamic latch moves to a position which is substantially perpendicular to a tangent of said magnetic discs as a result of the force of the air stream.

5. A magnetic disc apparatus as claimed in claim 4, wherein a moveable vane of said aerodynamic latch is formed in substantially a linear shape, and wherein an extension line of a straight line drawn through said moveable vane is directed substantially in a direction of the rotary shaft of said magnetic discs.

6. A magnetic disc apparatus as claimed in claim 4, wherein an outer end of said aerodynamic latch is provided to substantially oppose to an outer peripheral end surface of said magnetic discs, and the rotary shaft of said aerodynamic latch is provided adjacent a voice coil motor (VCM).

7. A magnetic disc apparatus as claimed in claim 4, wherein an outer end of a moveable vane of said aerodynamic latch moves toward said magnetic discs as a result of the force of the air stream.

8. A magnetic disc apparatus comprising:

a plurality of magnetic discs on a rotary shaft;

an arm supporting a magnetic head and inserted between said magnetic discs;

a rotary actuator to move said arm;

an aerodynamic latch to lock said arm to a substantially fixed position at a time when said magnetic discs are not rotated, and including a vane arrangement to unlock said arm by utilizing a force of an air stream at a time when said magnetic discs are rotated, wherein all vanes of said vane arrangement are disposed outside a periphery of said magnetic discs;

a ramp for loading and unloading said magnetic head; and a housing having a shroud portion formed in a concentric circular arc shape with said magnetic discs, said shroud surrounding at least a majority of a side surface of said magnetic discs, wherein said ramp is disposed in a return flow passage of the air stream flowing back to said magnetic discs;

wherein a body of said moveable vane of said aerodynamic latch moves to a position which is substantially perpendicular to a tangent of said magnetic discs as a result of the force of the air stream.

9. A magnetic disc apparatus as claimed in claim 8, wherein an outer end of a moveable vane of said aerodynamic latch moves toward said magnetic discs as a result of the force of the air stream.

10. A magnetic disc apparatus comprising:

a plurality of magnetic discs on a rotary shaft;

an arm supporting a magnetic head and inserted between said magnetic discs;

a rotary actuator to move said arm;

an aerodynamic latch to lock said arm to a substantially fixed position at a time when said magnetic discs are not rotated, and including a vane arrangement to unlock said arm by utilizing a force of an air stream at a time when said magnetic discs are rotated, wherein all vanes of said vane arrangement are disposed outside a periphery of said magnetic discs;

a ramp for loading and unloading said magnetic head;

a housing having a shroud portion formed in a concentric circular arc shape with said magnetic discs, said shroud surrounding at least a majority of a side surface of said magnetic discs; and a supplemental shroud member is provided between a rotary actuator in a side where said aerodynamic latch is provided and said magnetic discs, and wherein an outer end of a moveable vane of said aerodynamic latch moves toward said supplemental shroud member at a time when said aerodynamic latch moves as a result of the force of the air stream;

wherein a body of said moveable vane of said aerodynamic latch moves to a position which is substantially perpendicular to a tangent of said magnetic discs as a result of the force of the air stream.

11. A magnetic disc apparatus as claimed in claim 10, wherein an outer end of a moveable vane of said aerodynamic latch moves toward said magnetic discs as a result of the force of the air stream.

12. An electronic system comprising:

magnetic disc apparatus including:

a plurality of magnetic discs on a rotary shaft;

an arm supporting a magnetic head and inserted between said magnetic discs;

a rotary actuator to move said arm; and an aerodynamic latch to lock said arm to a substantially fixed position at a time when said magnetic discs are not rotated, and including a vane arrangement to unlock said arm by utilizing a force of an air stream generated at a time when said magnetic discs are rotated, wherein all vanes of said vane arrangement are disposed outside a periphery of said magnetic discs, and wherein an outer end of said aerodynamic latch is provided to substantially oppose to an outer peripheral end surface of said magnetic discs; and wherein a body of said moveable vane of said aerodynamic latch moves to a position which is substantially perpendicular to a tangent of said magnetic discs as a result of the force of the air stream.

13. An electronic system as claimed in claim 12, wherein a moveable vane of said aerodynamic latch is formed in substantially a linear shape, and wherein an extension line of a straight line drawn through said moveable vane is directed substantially in a direction of the rotary shaft of said magnetic discs.

14. A magnetic disc apparatus as claimed in claim 12, wherein an outer end of a moveable vane of said aerodynamic latch moves toward said magnetic discs as a result of the force of the air stream.

* * * * *